United States Patent [19]

Krishnan et al.

[11] Patent Number: 4,886,652
[45] Date of Patent: Dec. 12, 1989

[54] PRODUCTION OF METAL CARBIDES

[75] Inventors: Gopala Krishnan, Sunnyvalle; Michael Gusman, Palo Alto; Sylvia M. Johnson, Piedmont, all of Calif.; David J. Rowcliffe, Stockholm, Sweden; Hajime Nakano, Osaka, Japan

[73] Assignee: Osaka Gas Co., Ltd., Osaka, Japan

[21] Appl. No.: 185,132

[22] Filed: Apr. 22, 1988

Related U.S. Application Data

[63] Continuation-in-part of Ser. No. 903,742, Oct. 27, 1986, abandoned.

[51] Int. Cl.$^4$ .................. C01B 31/30; C01B 31/36
[52] U.S. Cl. .................. 423/439; 423/345; 423/440; 501/87; 501/88; 501/93
[58] Field of Search .................. 423/345, 439, 440, 62, 423/69; 501/87, 88, 93; 156/DIG. 64, DIG. 75

[56] References Cited

U.S. PATENT DOCUMENTS

| | | | |
|---|---|---|---|
| 2,907,972 | 10/1969 | Schildhauer et al. | 501/88 |
| 3,438,729 | 4/1969 | Ohlgren | 501/87 |
| 3,743,499 | 7/1973 | Ramquist | 423/440 |
| 3,758,662 | 9/1973 | Tobin et al. | 423/440 |
| 3,927,181 | 12/1975 | Niimi et al. | 423/345 |
| 4,226,841 | 10/1980 | Komeya et al. | 423/345 |
| 4,244,902 | 1/1981 | Shinozaki | 264/56 |
| 4,256,530 | 3/1981 | Schmid et al. | 156/DIG. 83 |
| 4,514,346 | 4/1985 | Luhleich et al. | 501/88 |

FOREIGN PATENT DOCUMENTS 8500362 1/1985 PCT Int'l Appl. .................. 501/88

Primary Examiner—John Doll
Assistant Examiner—Robert M. Kunemund
Attorney, Agent, or Firm—Flehr, Hohbach, Test, Albritton & Herbert

[57] ABSTRACT

Production of carbide shapes of silicon, titanium or vanadium by reaction of carbon with the metal in liquid phase such being carried out by heating a mixture of particles of carbon and particles of the metal rapidly to the melting point of the metal, thereby minimizing solid state reaction, and holding at a temperature and for a time sufficient to cause reaction. The metal and carbon particles are about 0.05 to 10 mm in diameter. An organic binder is used which volatilizes or dissociates upon heating.

7 Claims, 1 Drawing Sheet

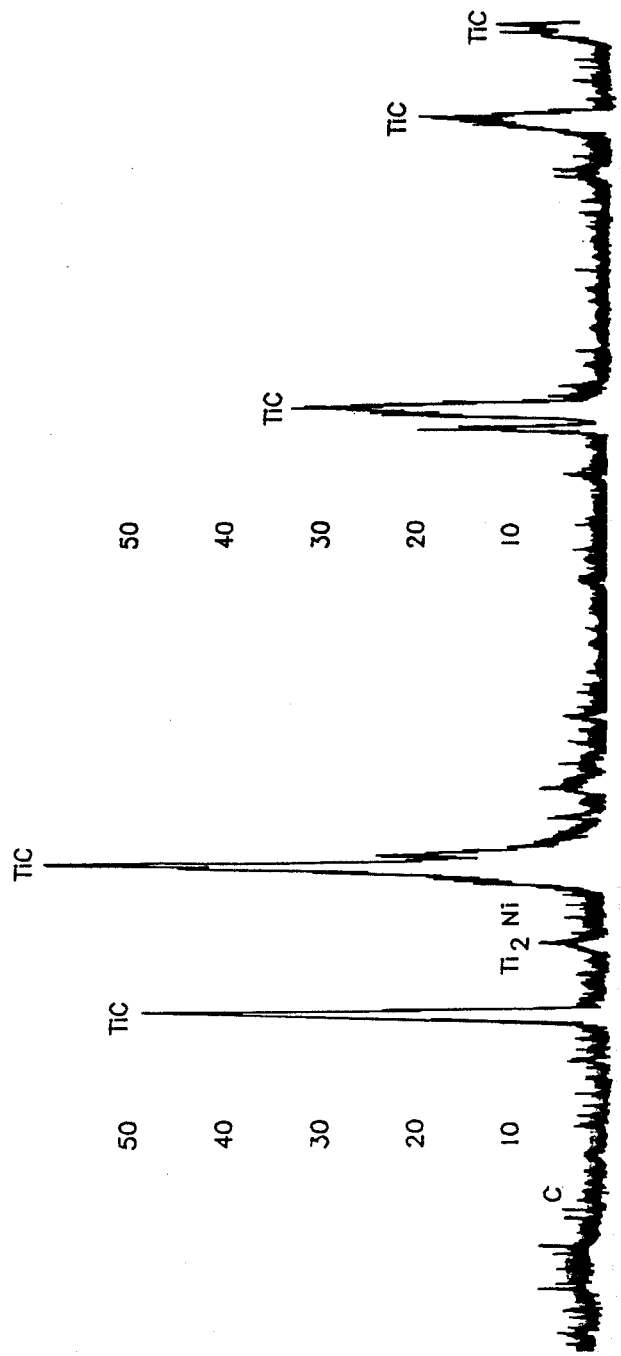
FIG. I

PRODUCTION OF METAL CARBIDES

This application is a continuation-in-part of our copending application Ser. No. 903,742 filed Oct. 27, 1986, entitled "Production of Metal Carbides.", now abandoned.

BACKGROUND OF THE INVENTION

1. Field of the Invention

This invention relates to the production of bodies or shapes of carbides of silicon, titanium and vanadium.

Several methods of producing silicon carbide bodies are known, for example, Yamada and others in Ceramic Bulletin, Volume 64, No. 2, pages 319 to 321 (1985) describe a process in which a mixture of silicon powder and carbon powder in compacted form is held in a suitable container and is ignited on one surface to initiate reaction between silicon and carbon. The exothermic, self-sustaining reaction proceeds in a front through the mass.

Difficulties with this method include the following: It is necessary to maintain a uniform front otherwise an inferior product results; it is necessary to confine the mass; high pressure is required; and a high ignition temperature is required.

Other methods of fabrication of bodies include cold compaction to the desired shape and sintering at high temperature; deposition of an organic compound of silicon; etc. References to such prior art processes include:

S. Prochazka, "Sintering of Silicon Carbide", *Materials and Coatings to Resist High Temperature Corrosion*, edited by D. R. Holmes and A. Rahmel, Applied Science Publishers Ltd., England, 1978; R. A. Alliegro, "Processing and Fabrication of Non-Hot Pressed Silicon Carbide," *Materials and Coatings to Resist High Temperature Corrosion*, edited by D. R. Holmes and A. Rahmel, Applied Science Publishers Ltd., England, 1978; U.S. Pat. Nos. 3,495,939; 2,938,807; 2,964,823; Kennedy and Shennan, "Engineering Application of Refel Silicon Carbide, ATOM 206, pages 260-267; General Electric Company, Technical Information Series, authored by Hillig et al., entitled "Silicon/Silicon Carbide Composites"; P. Popper, "Special Ceramics" 1960, page 209 et seq., Heywood, London; and C. W. Forrest, P. Kennedy and J. V. Shennan, "The Fabrication and Properties of Ceram, Self-Bonded Silicon Carbide Bodies: Special Ceramics 5," edited by P. Popper, Brit. Ceram. Res. Assn. 1972, p. 99.

The production of solid shapes of carbides of titanium and vanadium by known methods also involve difficulties.

Another method of producing silicon carbide is described by Lubleich, U.S. Pat. No. 4,514,346, in which silicon and carbon produce silicon carbide, but in this case a binder such as novolak resin is used which does not volatize and which forms a coating on the surface of silicon and carbon particles in a coking process. This binder coke as well as carbon added as such reacts with silicon to produce SIC. A 5° C./minute rate of heating, which is not considered to be rapid enough, is also used by Lubleich.

Therefore this method is not economical because it is very complicated to handle the binder when mixing with the siicon and carbon. Besides, it is not clear in Lubleich's patent whether the reaction occurs in solid phase or liquid phase whereas the reaction of the present invention occurs in liquid phase.

GENERAL DESCRIPTION OF THE INVENTION

In accordance with the present invention, a mixture of particles of the desired metal (silicon, titanium or vanadium) and particles of carbon is prepared and is heated by external application of heat to a temperature sufficient to melt the metal and reaction is caused to occur between the solid carbon and the liquid metal by maintaining a temperature at or above but preferably not greatly exceeding the melting point of the metal.

The invention will be described first with respect to the preparation of silicon carbide from silicon and carbon.

In carrying out the solid phase carbon/liquid phase silicon reaction in accordance with the invention, the mixture of silicon particle and carbon particles should be brought to the melting point of silicon quickly to minimize solid solid state reaction and the particles of carbon and of silicon are preferably somewhat coarse for the same purpose, that is to say, to minimize the solid state reaction between carbon and silicon. To the extent that solid phase reaction occurs, the product is inferior, e.g., it is soft and non-cohesive.

Similar considerations are applicable to the preparation of titanium and vanadium carbides.

BRIEF DESCRIPTION OF THE FIGURE

The FIGURE shows an X-ray diffraction analysis of sintered pellets indicating TiC and $Ti_2Ni$ are present.

DETAILED DESCRIPTION OF THE INVENTION

Sources of Carbon. Any form of carbon may be used. Preferably it is from a source which is inexpensive such as metallurgical or foundry coke. Other suitable forms of carbon are amorphouse carbon, charcoal and graphite. Also mixtures of two or more such forms of carbon may be used.

Sources of Silicon, Titanium and Vanadium. Any form of the commercially available metal of reasonable purity, e.g., above 90%, may be used for the purpose, e.g., metallurgical grade, electronic grade, solar grade, single crystalline or polysilicon scrap; also similar grades of titanium and vanadium. Suitable alloys of these metals with one another or, as in the case of titanium, a titanium-nickel alloy may be used. In general an alloy of silicon, titanium or vanadium with another metal which does not interfere with formation of the desired carbides may be present, as in the case of a titanium-nickel alloy. Such alloying metal, exemplified by nickel in the titanium-nickel alloy, should be a weak carbide former.

Particle Range Size. Preferably the carbon particles are about 0.05 to 10 mm in diameter, preferably 0.05 to 1 mm and the metal particles are about 0.05 to 10 mm in diameter, preferably 0.05 to 1 mm.

Binders. The binders are required in holding the mass together to form a shape. Thus unshaped products such as silicon carbide sand may be prepared without the use of a binder. Where a binder is used the carbon and metal are intimately mixed with a suitable binder which will serve to hold the mass together to form a green shape and which will volatilize and/or dissociate upon moderate heating, for example, 250° to 500° C.

Th gasified binder on heating is preferably purged from the reactor with an inert gas or is burned with a fuel gas. The binder used therefore forms substantially no binder coke during the heating step.

Examples of suitable binders are polyethylene glycol, polyvinyl alcohol, methyl-cellulose and the like. The amount of binder is variable with the kind of binder, etc., but usually 2 to 15%, preferably 5 to 10%, based on the total weight of the metal, carbon and binder.

Shaping. The mixture of carbon, metal and binder (the so-called "green" mixture) may be shaped to the desired shape and dimensions of the end product. One of the advantages of the present invention is that there is relatively little change in dimensions and that the reaction product needs little or no working to bring it to the desired dimensions and shape.

Reaction Conditions. The green shape is then heated rapidly to a temperature above the melting point of the metal in an inert gas atmosphere comprising argon, helium or the like which does not react with the metal at an elevated temperature and is held at that temperature for a sufficient period of time to substantially complete the reaction of the metal and carbon to form the metal carbide in the atmosphere. Pressure is not invariably necessary. The heating rate should be sufficiently high so that a substantial portion of metal will melt and can react in the liquid state. Slow heating rates that allow a substantial reaction between the solid phases are to be avoided. Desirable heating rates depend on the particle size of metal and carbon, the size of the part being converted and on the type of carbon. Smaller particles require a more rapid heating to minimize the extent of solid state reaction.

Heating is preferably conducted in the absence of $O_2$ and $N_2$. $O_2$ and $N_2$ in the heating atmosphere which may react with the green shape to produce oxides and nitrides and deteriorate the properties and yield of the desired product. Similarly, amorphous carbons react more slowly than crystalline carbons (graphite), and likewise ungraphitized coke is less reactive than graphitized materials.

When the particles used have smaller sizes, it is advantageous to place the particles under reduced pressure to remove oxygen adsorbed on the surface of the particles.

Proportions of Metal and Carbon. These may vary considerably. For example, they may be used in stoichiometric proportions or the carbon may be in excess or the metal may be in excess. Ordinarily, it is prefered to use the carbon in excess, particularly where it is an inexpensive form of carbon such as coke. An added advantage of using an excess of carbon is that more of the metal, which is the more expensive component, is reacted. The preferred proportions of carbon to metal are between 1:1 and 5:1, atomic basis.

Removal of Excess Carbon. Also the excess unreacted carbon may be removed by oxidation, for example, by heating the formed product in air in the temperature range 800°–1200° C., which gives the end product a desirable porosity, therefore improves its heat insulation and gas permeability.

Production of Silicon Carbides

The following examples will serve to illustrate the practice of the invention.

EXAMPLE 1

Ingredients were foundry coke of 0.1 mm, 0.5 mm and 1.0 mm nominal diameter; silicon particles of the same three nominal diameters, and polyethylene glycol (mol. wt.=4000) as the binder. (Nomial diameter refers to the approximate size of the majority of particles in a size fraction produced by seiving.) That is, nine mixtures were prepared as follows: Mixture No. 1–0.1 mm coke, 0.1 mm silicon; No. 2–0.1 mm coke, 0.5 mm silicon; No. 3–0.1 mm coke, 1.0 mm silicon; No. 4–0.5 mm coke, 0.1 mm silicon, etc. The atomic ratio of coke (calculated as pure carbon) to silicon was 1 to 1.

These mixtures were compacted in a cylindrical die at pressures varying from 2500 to 40,000 psi. Little change in green density of the specimens was noted within this pressure range.

The binder was removed (dewaxed) by heating to a temperature of 400° C. in hydrogen. The specimens were then heated in a carbon resistance furnace to 800° C. in vacuum and then to the reaction temperature of 1550° C. in an argon atmosphere, at a rate of 50° C./min. The specimens were held at 1550° C. for 90 minutes. Results are set forth in Table 1.

TABLE 1

PHYSICAL CHARACTERISTICS OF 1.30 cm DIAMETER GREEN PELLETS AFTER SINTERING AT 1550° C. FOR 90 MINUTES

| | Coke Particle Size | | | | | | | | |
|---|---|---|---|---|---|---|---|---|---|
| | 0.1 mm | | | 0.5 mm | | | 1.0 mm | | |
| Pressure (psi) | Diameter (cm) | Thickness (cm) | Bulk Density (g cm) | Diameter (cm) | Thickness (cm) | Bulk Density (g cm) | Diameter (cm) | Thickness (cm) | Bulk Density (g cm) |
| 0.1 mm Silicon | | | | | | | | | |
| 2,500 | 1.323 | 0.529 | 1.06 | 1.284 | 0.481 | 1.47 | | | |
| 5,000 | 1.335 | 0.501 | 1.17 | 1.306 | 0.452 | 1.50 | irregular specimen | | |
| 10,000 | 1.357 | 0.488 | 1.11 | 1.269 | 0.497 | 1.43 | | | |
| 20,000 | 1.329 | 0.501 | 1.15 | 1.288 | 0.474 | 1.41 | | | |
| 40,000 | 1.318 | 0.516 | 1.14 | 1.292 | 0.464 | 1.48 | irregular specimen | | |
| 0.5 mm Silicon | | | | | | | | | |
| 2,500 | | | | 1.294 | 0.471 | 1.44 | | | |
| 5,000 | 1.310 | 0.533 | 1.24 | 1.288 | 0.503 | 1.36 | 1.305 | 0.475 | 1.37 |
| 20,000 | | | | 1.294 | 0.463 | 1.50 | | | |
| 40,000 | 1.360 | 0.496 | 1.23 | 1.304 | 0.460 | 1.47 | 1.286 | 0.462 | 1.51 |
| 1.0 mm Silicon | | | | | | | | | |
| 2,500 | | | | 1.291 | 0.462 | 1.49 | | | |
| 5,000 | 1.30 | 0.433 | 1.60 | 1.307 | 0.452 | 1.43 | 1.280 | 0.429 | 1.67 |
| 10,000 | | | | 1.286 | 0.475 | 1.47 | | | |
| 20,000 | | | | 1.299 | 0.453 | 1.52 | | | |
| 40,000 | 1.31 | 0.438 | 1.57 | 1.290 | 0.442 | 1.58 | 1.299 | 0.442 | 1.58 |

Microscopic observation of the sintered specimens and physical measurements established the following points of significance. The dimensions of the sintered specimens did not differ greatly from the dimensions of the green specimens. Therefore, one can achieve products which require little or no post reaction processing for their intended use, e.g., as refractory bricks or tiles for lining furnaces, etc. The size of macropores in the sintered specimens depends more on the particle size of the silicon than on the particle size of the coke. Unreacted silicon appears to coat the particles. The yield of silicon carbide increases as the particle size of the coke diminishes.

EXAMPLE 2

Similar experiments were conducted but with specimens 2.863 cm in diameter and with different periods of time at the reaction temperature (1550° C.). Results are set forth in Table 2.

TABLE 2
EXTENT OF CONVERSION OF SI TO SIC AS A FUNCTION OF PARTICLE SIZE AND TIME AT 1550° C.

| Run No. | Time (min) | Particle Size (mm) | SiC/Si | % Conversion[a] |
|---|---|---|---|---|
| 51 | 180 | 0.1 | 9.5 | 82.7 |
|  |  | 0.5 | 1.27 | 55.0 |
|  |  | 1.0 | 0.72 | 40.0 |
| 47 | 360 | 0.1 | >15.0 | >72 |
|  |  | 0.5 | 1.28 | 55.0 |
|  |  | 1.0 | 1.39 | 54.1 |
| 49 | 720 | 0.1 | 7.7 | 78.4 |
|  |  | 0.5 | 1.42 | 57.0 |
|  |  | 1.0 | 1.32 | 53.8 |

[a]Percent conversion was calculated from the observed SiC/Si molar ratio observed from X-ray diffraction and the mass loss. A mass loss of 7% was assumed to be due to the loss of bindr and moisture; the rest of the loss was assumed to be due to the loss of Si. The SiC/Si ratio is the molar ratio of sintered bodies.

Conclusions drawn were that conversion to SiC was greater with finer particles. However, the sintered specimens had a low density, there was a higher loss of mass and a larger change in dimensions and the sintered specimens had a lower cohesiveness. These results indicate that more solid state reaction occurred with the fine-particle sizes.

EXAMPLE 3

Three different sources of coke (foundry coke, metallurgical coke and needle coke) were used in the atomic ratio of 1 to 1. The particle size of both silicon and coke was 0.5 mm. The green unsintered specimens were prepared as in Example 1 above. Results are set forth in Table 3.

TABLE 3
CHARACTERISTICS OF THE PELLETS MADE FROM DIFFERENT COKES[a]

| Characteristic | Green Pellet | Sintered Pellet |
|---|---|---|
| Foundry Coke |  |  |
| Diameter (cm) | 2.863 | 2.957 |
| Height (cm) | 2.839 | 2.856 |
| Mass (g) | 29.976 | 27.576 |
| Bulk density (g.cm$^{-3}$) | 1.64 | 1.41 |
| SiC/Si mole ratio |  | 1.66 |
| Metallurgical Coke |  |  |
| Diameter (cm) | 2.863 | 2.920 |
| Height (cm) | 2.837 | 2.891 |
| Mass (g) | 29.979 | 27.786 |
| Bulk density (g.cm$^{-3}$) | 1.64 | 1.44 |
| SiC/Si mole ratio |  | 1.66 |
| Needle Coke |  |  |
| Diameter (cm) | 2.863 | 2.956 |
| Height (cm) | 2.760 | 2.872 |
| Mass (g) | 29.877 | 26.866 |
| Bulk density (g.cm$^{-3}$) | 1.68 | 1.36 |
| SiC/Si mole ratio |  | 1.15 |

[a]Particle size of both Si and cokes were 0.5 mm, reaction temperature was 1550° C., and duration was 360 min.

EXAMPLE 4

Non-stoichiometric mixtures of silicon and coke, containing an excess of coke, were prepared and sintered using procedure similar to that of Example 1 except that the holding time was 360 minutes. The particle size of silicon and carbon used was 0.5 mm. Results are set forth in Table 4.

TABLE 4
CHARACTERISTICS OF SiC PELLETS MADE FROM NONSTOICHIOMETRIC COKE-Si MIXTURES

| Characteristic | Green Pellet | Sintered Pellet |
|---|---|---|
| Coke:Si = 1.5:1 |  |  |
| Diameter (cm) | 2.863 | 2.926 |
| Length (cm) | 2.962 | 2.985 |
| Mass (g) | 30.026 | 27.844 |
| Bulk density (g.cm$^{-3}$) | 1.575 | 1.387 |
| SiC/Si mole ratio | — | >20 |
| Coke:Si = 2:1 |  |  |
| Diameter (cm) | 2.863 | 2.911 |
| Length (cm) | 3.045 | 3.019 |
| Mass (g) | 30.053 | 28.090 |
| Bulk density (g.cm$^{-3}$) | 1.533 | 1.398 |
| SiC/Si mole ratio | — | a |
| Coke:Si = 3:1 |  |  |
| Diameter (cm) | 2.863 | 2.894 |
| Length (cm) | 3.071 | 3.057 |
| Mass (g) | 30.048 | 27.80 |
| Bulk density (g.cm$^{-3}$) | 1.520 | 1.382 |
| SiC/Si mole ratio | — | a |
| Coke:Si = 4:1 |  |  |
| Diameter (cm) | 2.863 | 2.90 |
| Length (cm) | 3.153 | 3.180 |
| Mass (g) | 30.026 | b |
| Bulk density (g.cm$^{-3}$) | 1.479 | b |
| SiC/Si mole ratio | — | a |

[a]The presence of Si was undetectable by XRD analysis. The ratio if estimated to be greater than 30 based on the sensitivity of the technique.
[b]Part of the specimen was damaged during transfer from the dewaxing furnace to the sintering furnace.

These results show that a higher yield of SiC is obtained per unit of Si by using a substantial excess of coke. This is more economical because silicon is the more expensive reactant. It has been observed that by using finer particles, conversion to SiC is increased but unwanted solid state reaction occurs.

EXAMPLE 5

Using a procedure similar in that of Example 1, sintered bars 8 cm long, 1.7 cm wide and 1.6 cm thick were made. Each bar was sliced into two bars 0.7 cm thick and 0.9 cm thick and were tested with results as set forth in Table 5 below.

TABLE 5
MODULUS OF RUPTURE OF SINTERED PELLETS

| Run No. | Particle size (mm) Coke | Silicon | Sintering Time (min) | MOR[a] (Mpa) |
|---|---|---|---|---|
| 41 | >0.1 | 0.8 & 0.3 | 180 | 7.6 |
| 54-1 | 0.1 | 0.5 | 360 | 8.8 |

TABLE 5-continued

MODULUS OF RUPTURE OF SINTERED PELLETS

| Run No. | Particle size (mm) Coke | Silicon | Sintering Time (min) | MOR[a] (Mpa) |
|---|---|---|---|---|
| 54-2 | 0.1 | 0.5 | 360 | 15.6 |
| 42 | 0.8 & 0.3 | 0.8 & 0.3 | 180 | 12.8 |
| 46 | 0.8 & 0.3 | 0.8 & 0.3 | 360 | 10.8 |
| 40 | 0.8 | 0.8 | 90 | 9.7 |
| 56[b] | 0.5 | 0.5 | 360 | 10.2 |
| 57[c] | 0.5 | 0.5 | 360 | 11.6 |
| 56-Ox[d] | 0.5 | 0.5 | — | 12.9 |
| 57-Ox[d] | 0.5 | 0.5 | — | 11.2 |

[a]Modulus of rupture measured in four point loading.
[b]Coke-to-Si ratio = 1.5.
[c]Coke-to-Si ratio = 2.
[d]The bars were oxidized at 900° C. for 6 hours.

PRODUCTION OF TITANIUM AND VANADIUM CARBIDES

Titanium, vanadium and a titanium-nickel alloy (24.5% Ni) were used which were in excess of 99% purity. They were used in nominal sizes of 0.1 mm, 0.5 mm and 1.0 mm with coke particles of the same size. X-ray diffraction examination showed that the Ti-Ni alloy consisted of $Ti_2Ni$ phase with excess Ti and a small amount of unalloyed Ni.

The metals were mixed with coke particles of the same nominal size. Polyethylene glycol (molecular weight=4000) was used as the binder in the amount of 5% for Ti-coke and V-coke; 10% for Ti-Ni-Coke because of the difficulty in pressing the pellets.

The dried mixtures were pressed in a cylindrical die (2.863 cm diameter) at pressures from 69 MPa to 207 MPa. The binder from the pressed pellets was removed (dewaxed) by heating to a temperature of 450° C. in argon. The pellets were then heated in a high temperature carbon resistance furnace initially to 800° C. in vacuum at a rate of 10° C./min. and then to the reaction temperature at a rate of 50° C./min. After reaction sintering the pellets were cooled and subjected to various examinations.

The extent of conversion of the metal to the corresponding carbide was inferred from the XRD analysis. The bulk density of the sintered pellets was determined from the mass and exterior dimensions. The apparent density was measured using ASTM test procedure C830-83. The modulus of rupture was determined from 4-point bend test using bars cut from sintered rectangular shapes (nominal 2 by 2 by 8 cm).

EXAMPLE 6

Titanium-Coke Mixtures

Several cylindrical pellets of Ti-Coke mixtures were die pressed using 0.1, 0.5, and 1.0 mm particles. The mole ratio of Ti to coke was 1:1. The bulk densities of the pellets were dependent on the pressing pressure; they varied from $2.0\pm0.1$ g.cm$^{-3}$ for a pressure of 69 MPa to 2.5 g.cm$^{-3}$ for a pressure of 207 MPa. For a given pressing pressure the bulk density did not vary significantly ($\pm0.1$ g.cm$^{-3}$) with the particle size.

For particles in the range of 0.1 to 1 mm, a heating rate of 50° C./min was found to be adequate to suppress the solid state reaction. Reaction temperatures from 1750° 1960° and times from 0.25 to 2 h were used.

The sintered pellets had only a 7 to 15% increase in dimension over the green pellets. The bulk and apparent densities of the pellets varied from 1.4 to 1.7 g.cm$^{-3}$. These densities varied somewhat randomly with no apparent relation to particle size, temperature or duration of sintering.

A small mass loss varying from 2 to 4 wt % was observed after the reaction sintering. The vapor pressure of liquid titanium at 2000 K (1723° C.) is about $1\times10^{-5}$ atm and thus some evaporation of Ti should be expected. The reaction between Ti and ash minerals such as $SiO_2$ in the coke to form volatile products (SiO, TiO) could also contribute to the observed mass loss.

A photomicrograph of test bars that were made from 0.1, 0.5, and 1.0 mm titanium and coke particles showed that the size of the macropores depends on the particle size; use of 0.1 mm particles resulted in pores of 0.1 to 0.2 mm in size whereas with the use of 0.5 and 1.0 mm particles pores of 2-3 mm and 5-7 mm in size were observed. Although the size of the macropores changed with the particle size, the porosity ($58\pm5\%$) did not vary significantly.

The reaction between liquid Ti and coke was rapid at 1750° C. X-ray diffraction analysis showed that after reaction at 1750° for 15 minutes, about 5 wt % of Ti remained unreacted when 0.5 mm particles were used. A somewhat higher (10 wt %) was observed after 1.0 mm particles were reacted for 15 minutes. In all the particle sizes tested no peaks corresponding to unreacted Ti were observed after reaction for 1 hour at 1750° C.

The modulus of rupture (MOR) of the test bars was determined after reaction sintering at 1750° C. for 30 minutes. The measured MORs varied from 5.8 MPa for bars made with 0.1 mm and 0.5 mm particles to 7.5 MPa for bars made with 1.0 mm particles. In highly porous ceramics the MOR is critically dependent on the defect or pore structure and is always lower than MOR of dense ceramics.

EXAMPLE 7

Vanadium-Coke Mixtures

The melting point of vanadium (1888° C.) is considerably higher than that of Ti (1668° C.). Hence the reaction sintering of vanadium-coke mixtures was performed in the temperature range of 1900° to 2000° C. Except for the increased reaction temperature and a lower heating rate, the experimental conditions were similar to those used in the Ti-coke experiments. The mole ratio of vanadium to coke was 1:1.

A constant pressing of 68.9 MPa was used to prepare the green pellets. The bulk density varied from 2.58 g.cm$^{-3}$ for pellets made from 0.1 mm particles to $3.0\pm0.1$ g.cm$^{-3}$ for pellets made from 0.5 and 1.0 mm particles. The lower bulk density of the pellets made from 0.1 mm particles may be due to friction between the particles that lower the compaction during pressing.

During sintering a heating rate of about 35° to 50° C./min was sufficient to suppress the solid state reaction so that the liquid metal-solid coke reaction predominates during the reaction sintering step. The pellets sintered at temperatures above 1835° C. were cohesive at the external surface. The center of the pellet (sample No. 28) made from 0.1 mm particles and sintered at 1835° C. was less cohesive indicating occurrence of some solid state reaction.

The appearances of pellets made from 0.1 and 0.5 mm particles and sintered at about 1975° C. were uniform. As in the case of Ti-coke mixtures, pellets made from 0.1 mm particles contained macropores in the size range of 0.1 to 0.2 mm whereas the macropore size of the pellets made from 0.5 mm particles were in the range of 1 to 2 mm. In spite of the large differences in the pore sizes the porosity of all pellets (as determined from bulk and apparent densities) was very similar at 51±3%.

The XRD analysis of the reacted pellets indicated that $VC_{0.88}$ was the major phase after reaction. The extent of conversion of V to $VC_{0.88}$ depended on the temperature and particle size of V and coke. No evidence of unreacted coke was observed with 0.1 mm particles. However, the pellets which were fabricated from 0.5 mm particles and sintered at 1890° C. showed the presence of unreacted coke. Similarly, the pellets made from 1.0 mm particles and sintered below 1965° C. contained unreacted coke. Hence it appears that the temperature to achieve complete conversion increases as the particle size increases.

The measured modulus of rupture for a bar made from 0.1 mm particles was about 11.3 MPa, which is higher than that of TiC-coke bars. We were unable to measure the MOR of a bar made from 0.5 mm particles because of large voids in the center of the specimen.

EXAMPLE 8

Ti-Ni Alloy-Cke Mixtures

The Ti-Ni (24.5 at %) alloy melts at 942° C., a temperature considerably lower than the melting point of Ti or Ni. This alloy is the eutectic composition and has the lowest melting point of any alloy in this system. Hence carbide formation using liquid metal-coke reaction could be conceivably carried out at moderate temperatures. Since Ti is a strong carbide former whereas Ni is a weak carbide former, TiC is expected to be the major carbide phase. In addition, the unreacted nickel phase could fill the pores created by the carbide formation. Based on the above reasoning we carried out several experiments to determine the properties of pellets made from coke and the Ti-Ni alloy.

The proportion of Ti-Ni alloy and coke used in the experiments was such that there is sufficient coke to form only TiC. Initially the binder from the green pellets was removed by heating in hydrogen. However, the dewaxed pellets were extremely fragile and difficult to handle. It was concluded that this behavior is due to the absorption of $H_2$ by Ti during dewaxing procedure and hence we changed the atmosphere to argon. Dewaxed pellets with satisfactory strength were obtained with this new procedure. The bulk density of pellets made from 0.1 mm particles was somewhat lower than those for pellets fabricated from 0.5 and 1.0 mm.

The reaction sintering of Ti-Ni alloy-coke mixtures was performed in the temperature range of 1100° to 1500° C. for durations of 0.25 and 1 h. The apparent density of the sintered pellets generally increased with higher reaction temperature and longer duration. The effects of particle size and temperature were more pronounced than that of reaction time.

The pellets made from Ti-Ni alloy were generally uniform in appearance. All the pellets were cohesive with no evidence of solid state reaction. It is believed that the cracks observed in some specimens may be due to flaws in the green pellets and not to have resulted from the sintering step. Slightly concave surfaces were observed for the pellets made from 0.1 and 0.5 mm particles. As in the case of Ti and V, the size of macropores increased with the size of starting particles. However, the pore structure was uniform and no gross movement of the liquid melt to the bottom of the specimen was noted except with 1.0 mm particles at 1500° C.

The porosity of the pellets (as determined from the bulk and apparent density measurements) was nearly similar at about 50±7% for most of the pellets. The external surfaces of pellets made from 0.1 and 0.5 mm particles were denser than the center of the specimen.

X-ray diffraction analysis of the sintered pellets indicated that TiC and $Ti_2Ni$ are phases present as shown in FIG. 1 which shows the X-ray diffraction pattern of the pellets. As expected, the extent of TiC formation depends on particle size, temperature, and time. For a particle size of 0.1 mm reaction above 1300° C. for 1 h was sufficient essentially to complete the reaction. With this particle size some unreacted alloy was observed at a reaction time of 0.25 h. As the particle size increased to 0.5 mm and above, some unreacted alloy was observed even after reaction at 1500° C. for 1 h; the pellets made from 0.5 mm particles contained less unreacted alloy than pellets made from 1.0 mm particles.

The modulus of rupture of the test bars made from the three particle sizes at 1500° C. for 1 hour indicated that the MOR increases as the particle size is decreased. The MOR increased from 5.4 MPa for bars made with 1.0 mm particles to 18.0 MPa for bars fabricated from 0.1 mm particles. The MOR of bars sintered using 0.5 mm particles was 14.3 MPa.

The nickel component improves mechanical properties such as toughness.

USES OF THE METAL CARBIDE PRODUCTS OF THE INVENTION

The sintered shapes of the present invention may be used as refractories, combustion chamber components, electrical resistance heating elements, gas burner components and metal grinding products.

It will be apparent that new and useful metal carbides and new and useful methods of preparing the same have been provided.

We claim:

1. A method of producing a porous carbide of at least one of the metals silicon, titanium and vanadium which comprises the steps of providing a mixture of solid particles, about 0.05 to about 10 mm in diameter, of carbon and of at least one of such metals and an organic binder which volatilizes or dissociates upon heating and leaves no substantial amount of coke, shaping a mass of the mixture to form a shaped body, heating the shaped body by application of heat so as to raise the temperature rapidly from a temperature at which a solid state reaction between the solid particles starts or from a temperature lower than that to a temperature at which the metal or metals are in the liquid state and holding at such a temperature to cause at least a substantial portion of the liquid metal to react with the carbon to form a carbide, such product being substantially free of coke resulting from heating the binder.

2. The method of claim 2 wherein the metal is silicon.

3. The method of claim 1 wherein the metal is titanium.

4. The method of claim 1 wherein the metal is vanadium.

5. The method of claim 3 wherein the titanium is used in the form of an alloy with nickel.

6. The method of claim 1 wherein the carbon is present in substantial excess of the metal.

7. The method of claim 6 wherein the carbon is in the form of coke.

* * * * *